Jan. 28, 1930. K. W. LIEBAU 1,745,021
TIRE DETREADING MACHINE
Filed Sept. 18, 1926    5 Sheets-Sheet 1
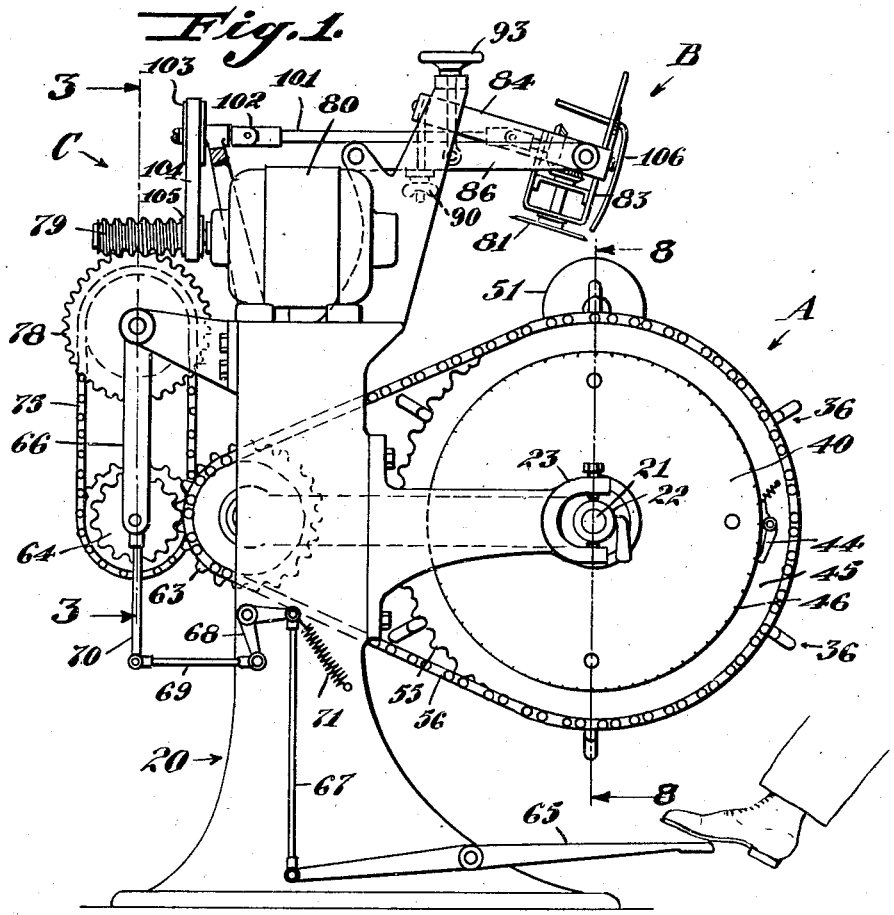
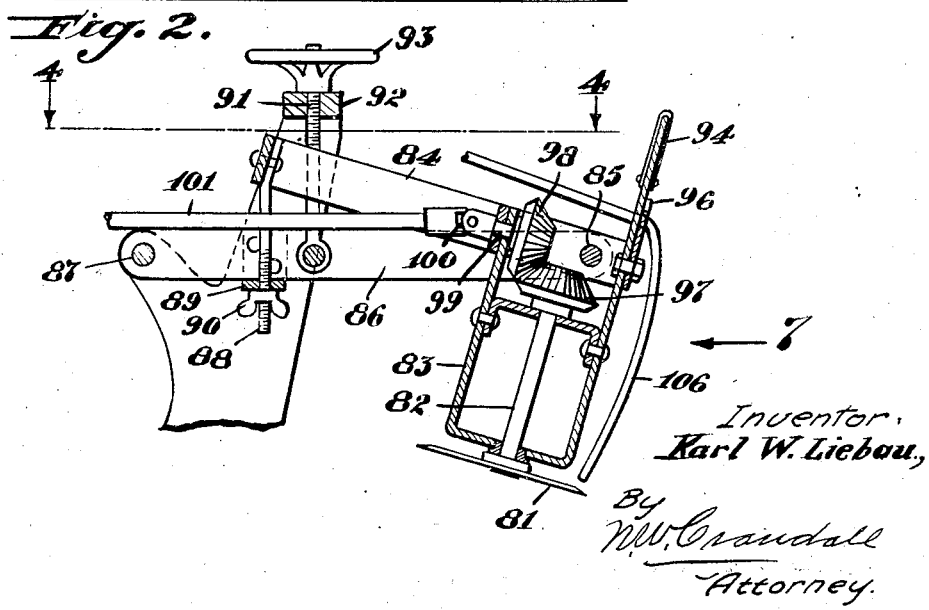
Inventor,
Karl W. Liebau,
By N.W. Crandall
Attorney.

Jan. 28, 1930.　　　　K. W. LIEBAU　　　　1,745,021
TIRE DETREADING MACHINE
Filed Sept. 18, 1926　　　5 Sheets-Sheet 2
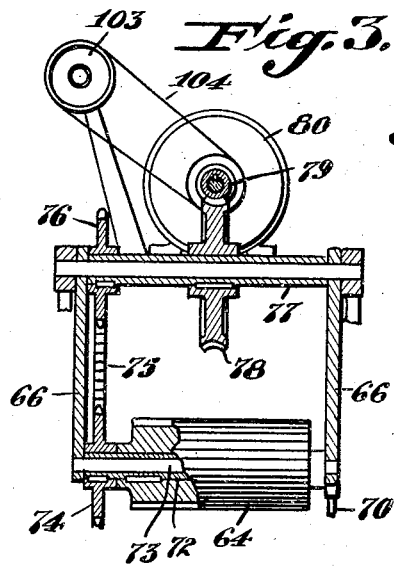
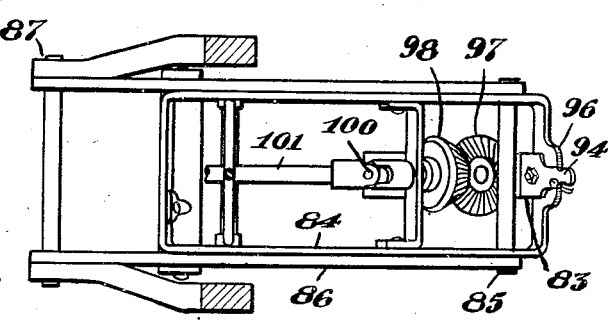
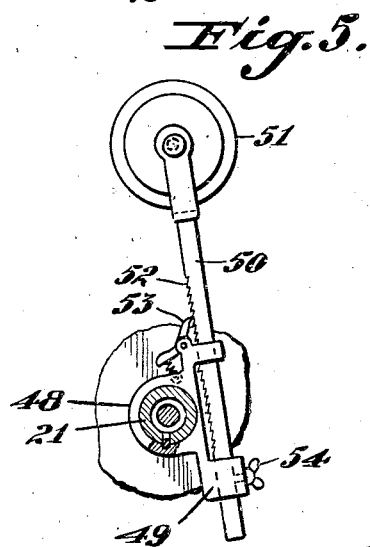
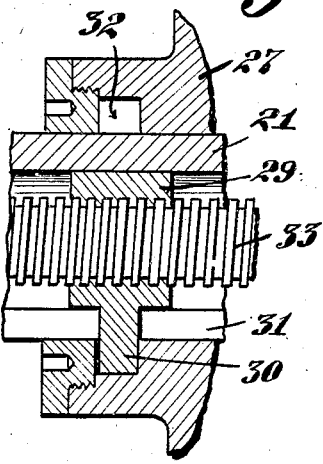
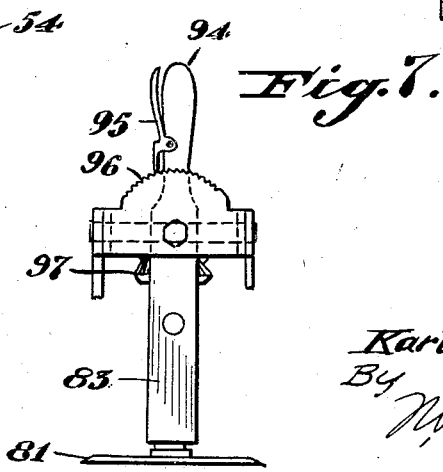
Inventor:
Karl W. Liebau,
By N. W. Crandall
Attorney.

Jan. 28, 1930. K. W. LIEBAU 1,745,021
TIRE DETREADING MACHINE
Filed Sept. 18, 1926    5 Sheets-Sheet 3
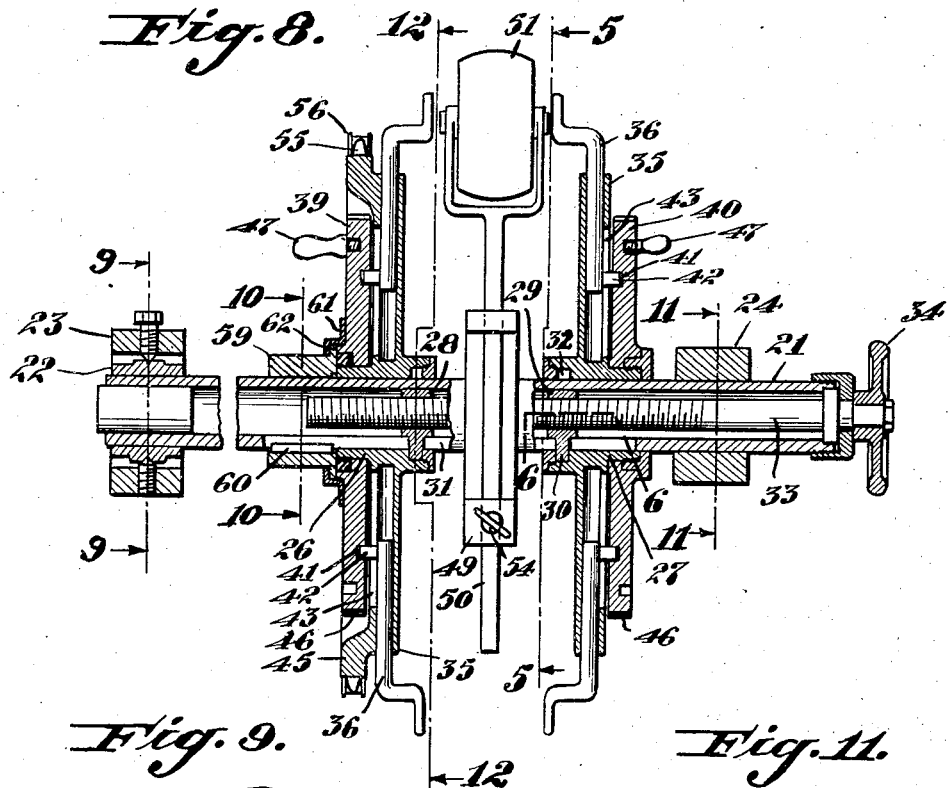
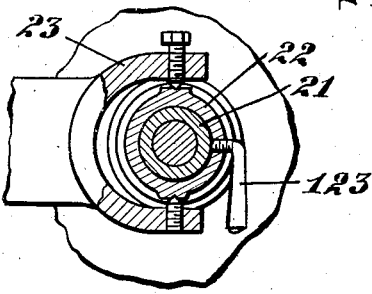
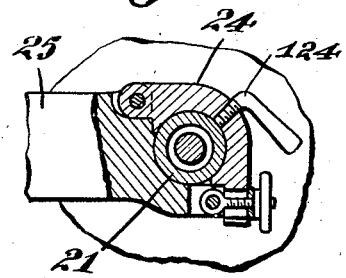
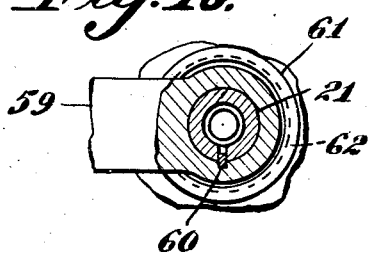
Inventor:
Karl W. Liebau,
By N. W. Crandall
Attorney.

Jan. 28, 1930.  K. W. LIEBAU  1,745,021
TIRE DETREADING MACHINE
Filed Sept. 18, 1926   5 Sheets-Sheet 4
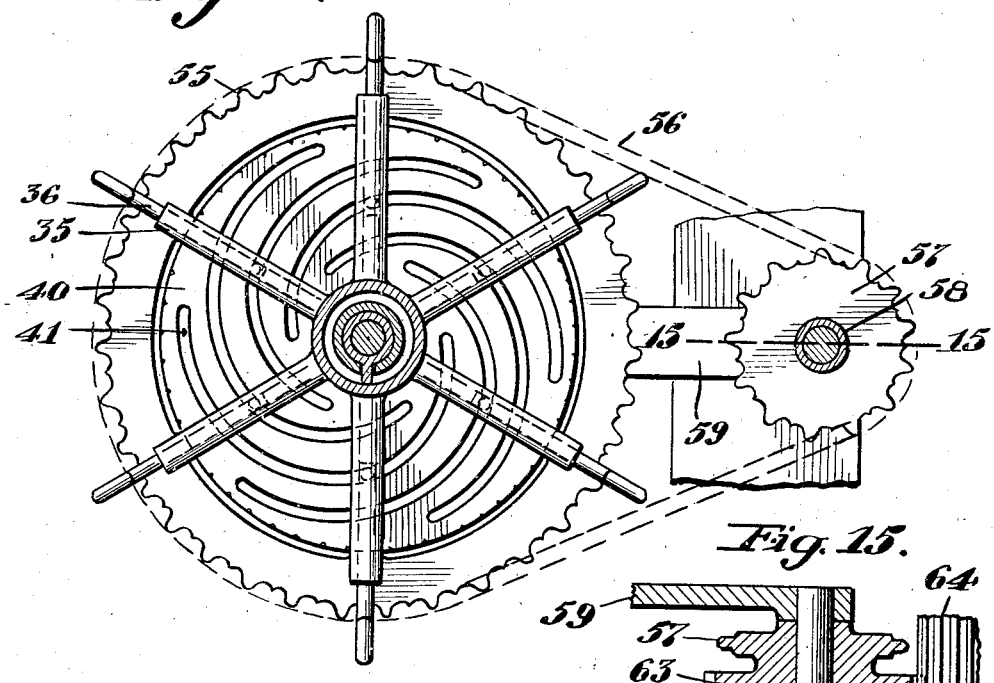
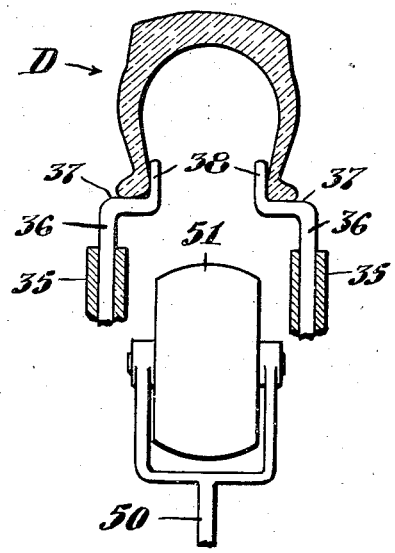
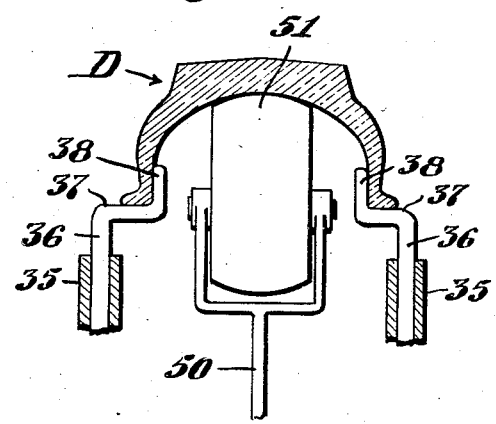
Inventor
Karl W. Liebau,
By N.W. Crandall
Attorney.

Jan. 28, 1930. K. W. LIEBAU 1,745,021
TIRE DETREADING MACHINE
Filed Sept. 18, 1926     5 Sheets-Sheet 5

Inventor:
Karl W. Liebau,
By M. V. Crandall
Attorney.

Patented Jan. 28, 1930

1,745,021

UNITED STATES PATENT OFFICE

KARL W. LIEBAU, OF LOS ANGELES, CALIFORNIA

TIRE-DETREADING MACHINE

Application filed September 18, 1926. Serial No. 136,372.

This invention relates to a tire detreading machine and has as its primary object the provision of a simple and effective mechanism whereby a tire may be rotated and presented to a manually controlled power operated severing device, whereby the tread portion of the tire carcass may be easily, simply and accurately removed.

Another object is to provide a revoluble support for a tire carcass operable to spread the side walls of the tire and adjustable to receive tires of various sizes, and which is so constructed as to enable quick and easy mounting of a tire thereon and its removal therefrom.

Another object is to provide a tread severing device and a mounting therefor so constructed and arranged that a power driven revolving cutting blade may be presented to the tread portion of a revolving tire and disposed so that the blade may effect a severing action circumferentially of the tire along various lines transversely of its perimeter.

Another object is to provide manually controlled means whereby the power-driven cutter may be raised and lowered and moved from side to side and forward and backward.

Another object is to provide a means whereby the tire carrier may be readily shifted from side to side so that the tread portion of a tire thereon may be aligned with the severing device and presented successively to the severing device and to an abrading tool.

With the foregoing objects in view, together with such other objects and advantages as may subsequently appear, the invention resides in the parts and in the construction, combination and arrangement of parts hereinafter described and claimed and illustrated by way of example in the accompanying drawings, in which:—

Fig. 1 is a view of the tire detreading machine as seen in side elevation;

Fig. 2 is a detail in vertical section illustrating the tread severing device and its mounting;

Fig. 3 is a detail in section and elevation as seen on the line 3—3 of Fig. 1;

Fig. 4 is a horizontal section and plan view as seen on the line 4—4 of Fig. 2;

Fig. 5 is a detail in elevation as seen on the line 5—5 of Fig. 8;

Fig. 6 is an enlarged detail in section as seen on the line 6—6 of Fig. 8;

Fig. 7 is a view in elevation as seen in the direction as indicated by the arrow 7 in Fig. 2;

Fig. 8 is a view in vertical section as seen on the line 8—8 of Fig. 1;

Fig. 9 is a detail in vertical section as seen on the line 9—9 of Fig. 8;

Fig. 10 is a detail in cross section as seen on the line 10—10 of Fig. 8;

Fig. 11 is a view in cross section as seen on the line 11—11 of Fig. 8;

Fig. 12 is a view in section and elevation as seen on the line 12—12 of Fig. 8;

Fig. 13 is a view in section illustrating the tire as initially positioned on its carrier;

Fig. 14 is a view showing the manner in which the tire is spread and supported on the carrier in readiness to be subjected to the detreading action of a severing device;

Fig. 15 is a horizontal section on line 15—15 of Fig. 12;

Figure 16:
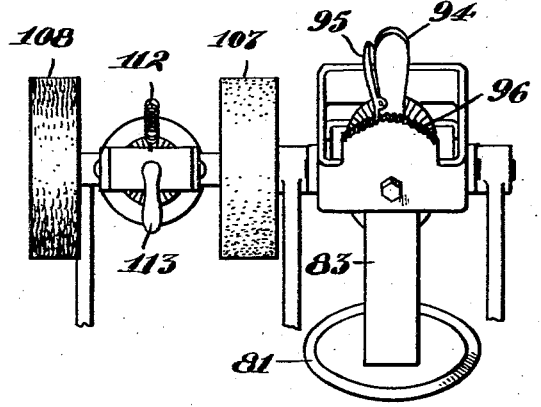
Fig. 16 is a view in elevation as seen in the direction indicated by the arrow 16 in Fig. 17.

Referring to the drawings more specifically, 20 indicates generally the frame-work of the machine, which may be of any suitable construction and on which is carried a tire supporting mechanism A, a severing device B and a power driving mechanism C, together with their associated parts, including transmission mechanism adjustments and manual control devices, as will hereinafter be more fully described.

The tire support includes a horizontally extending tubular shaft 21, one end of which is carried in a sleeve 22, swivelled in a yoke 23, on the frame 20, whereby the shaft 21 may be swung horizontally; the outer end of the shaft 21 being designed to be engaged by a clamping jaw 24, (see Fig. 11) mounted on a bracket 25 on the frame 20.

Mounted on the shaft 21 is a pair of spaced sleeves 26 and 27 which are free to rotate on the shaft and are slidable longitudinally thereof and arranged within the shaft 21 are slide blocks 28 and 29 having studs 30 projecting through a longitudinal slot 31 in the shaft 21 into engagement with internal annular channels 32 provided in the sleeves 26 and 27, as particularly shown in Fig. 6.

A stem 33 extends longitudinally into the tubular shaft 21 formed with right and left hand thread portions engaging the blocks 28 and 29 in such manner that on rotation of the stem 33, the blocks 28 and 29 together with the sleeves 26 and 27 may be moved longitudinally of the shaft 21 either toward or away from each other; the stem 32 being provided with a hand hold 34 arranged at the outer end of the shaft 21 and being held against longitudinal movement relatively to the shaft.

The sleeves 26 and 27 carry a series of radiating tubular spokes 35 in each of which is carried a telescoped extension 36; the end portions of which extensions are formed with inturned shoulders 37, and terminate in fingers 38 projecting from the shoulders 37, which shoulders and fingers are adapted to engage the inner marginal portions of the tire D, as shown in Figs. 13 and 14.

Means are provided for collectively adjusting the extent of the projection of the outer end portions of the extensions 36 carried by the tubular spokes of each sleeve to adapt them to receive tires of various diameters, which means is here shown as embodying turnable discs 39 and 40 carried on the sleeves 26 and 27 the inner faces of which discs are formed with a series of spiral grooves 41, as shown in Fig. 12 into which project pins 42 formed on the inner end portions of the extensions 36 and projecting through longitudinal slots 43 in the spokes 35, whereby on rotation of the discs 39 and 40 the extension 36 will be shifted longitudinally and will be held against movement lengthwise when the discs are held stationary relatively to the sleeves 26 and 27 which latter is effected by means of spring pressed pawls 44.

The pawls are mounted on rims 45 connecting the outer end portions of the spokes 35 and are engageable with peripheral notches 46 on the discs 39 and 40. The discs 39 and 40 are provided with hand-holds 47 by which they may be rotated relatively to the sleeves 26 and 27 in effecting adjustment of the tire engaging extensions.

Fixed on the shaft 21 intermediate the sleeves 26 and 27 is a collar 48, particularly shown in Fig. 5 carrying a guide 49 in which is mounted for longitudinal adjustment an upwardly extending bar 50, the upper end of which is fitted with a roller 51 having its outer periphery rounded transversely and which roller is adapted to be positioned to bear against the inner periphery of the tire opposite the tread portion thereof as shown in Fig. 14.

The bar 50 is formed with ratchet teeth 52 engageable with a spring pressed pawl 53 for holding the bar 50 against retractive movement and a set screw 54 is mounted in the guide 49 for engagement with the bar 50 to hold the latter against movement.

As a means for effecting rotation of the tire carrier sprocket teeth 55 are formed on the rim 45 connecting the spokes carried by one of the sleeves 26 and 27 with which sprocket teeth is engaged a sprocket chain 56 passing around a sprocket wheel 57, revolubly mounted on a stud shaft 58 carried by a horizontally extending bracket 59 projecting rearwardly from the shaft 21; the inner end of the bracket 59 being splined on the shaft 21 by means of a key 60, as shown in Figs. 8 and 10, and being connected to the sleeve 26 to move with the latter longitudinally of the shaft 21 by means of a flange 61 fixed on the disc 39 extending over and slidably engaging an annular flange 62 formed on the bracket 59.

Connecting with the sprocket wheel 57 is a spur gear 63 turnable on the stud shaft 58 with which an elongated spur pinion 64 may be intermeshed when it is desired to effect rotation of the sprocket wheel 57 and the tire carrier; the pinion 64 being adapted to be thrown in and out of engagement with the gear 63, as occasion may require, by the operation of a foot lever 65, here shown as connecting with a depending oscillatory hanger 66 carrying the pinion 64, through the medium of a rod 67 connecting the foot lever to one arm of a bell crank lever 68 the other arm of which bell crank lever is connected by a rod 69 to a stem 70 extending downwardly from the hanger 66.

A spring 71 exerts a pull on the bell crank lever 68 to normally maintain the pinion 64 out of mesh with the gear 63 when the shaft 21 is in its normal inner position. The elongated pinion 64 is fixed on a sleeve 72 revolubly mounted on a shaft 73 supported on the lower end of the hanger 66 and fixed on the sleeve 72 is a sprocket wheel 74 around which passes a sprocket chain 75 leading from a sprocket wheel 76 on a drive shaft 77. A worm wheel 78 on the shaft 77 is engaged by a worm 79 on the drive shaft of a motor 80 constituting the source of power for operating the machine.

Arranged above the roller 51 is a circular cutting blade 81 formed with a knife edge on its periphery which blade is mounted on a shaft 82 journalled in a frame 83 mounted for vertical adjustment and for oscillatory movement both laterally and forward and back and the frame 83 depending from and being pivotally connected to a frame 84 to swing laterally thereon, and the frame 84 being pivoted at 85 to swing vertically on the outer end of a frame 86 the inner end of which is pivoted to swing vertically at 87 on the main frame 20.

A threaded stem 88 on the inner end of the frame 84 extends through a bar 89 carried by the frame 86 and is fitted with a wing nut 90 which bears against the underside of the bar 89 and serves as a means of adusting the frame 84 to various positions around its pivoted mounting 85 so as to enable disposing of the cutter at various positions relatively to the horizontal and whereby the cutter may be presented tangentially to the tread of a tire being worked and also permit the cutter being adjusted forwardly or backwardly. Connecting with the frame 86 is an upwardly extending threaded stem 91 which extends through a bar 92 carried by the main frame 20 and has screw engagement with a hand wheel 92 whereby the outer end portion of the frame 86 may be adjusted vertically to raise or lower the cutter so as to regulate the depth of the cut.

The laterally adjustable frame 83 is provided with an upwardly extending handle 94 fitted with a spring pressed catch 95 engageable with a toothed segment 96 carried by the frame 84 whereby the frame 83 may be swung to various positions to dispose the cutter so that its cutting edge may be engaged with the tire tread at various points transversely thereof.

The shaft 82 is fitted with a beveled gear 97 which meshes with a gear 98 on a stud shaft 99 connecting through a universal joint 100 with a shaft 101 connecting through a universal joint 102 with a shaft fitted with a pulley 103 around which passes a belt 104 leading from a pulley 105 on the motor drive shaft, whereby the cutter is revolved. A hose 106 leading from any suitable source of water supply is arranged with its discharge end adjacent the knife edge of the cutter so as to feed water to the latter during the cutting action.

Figure 17:
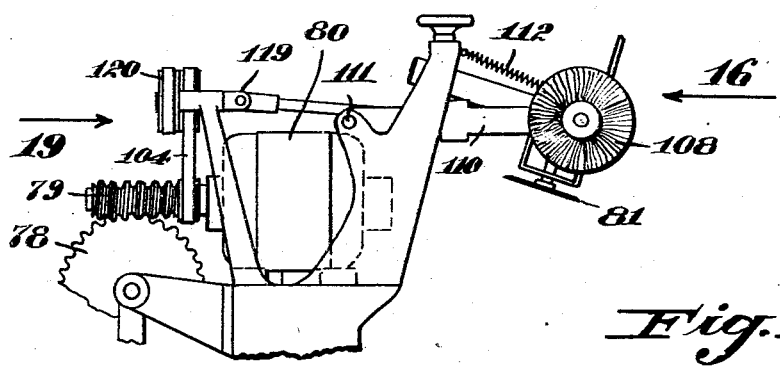
Fig. 17 is a view in side elevation illustrating the manner of equipping the machine with buffers.
Figure 19:
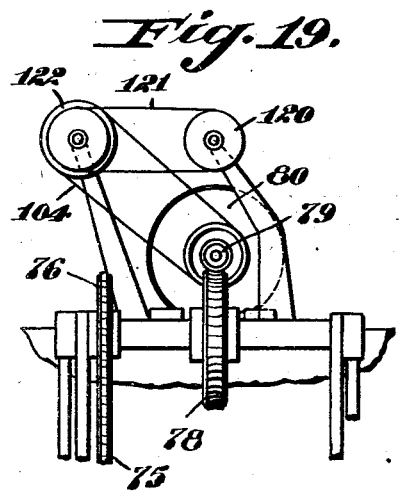
Fig. 19 is a view in elevation as indicated by the arrow 19 in Fig. 17, illustrating the buffer driving mechanism.
Figure 18:
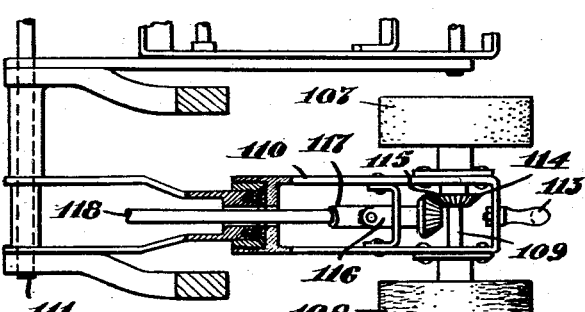
Fig. 18 is a plan view of the buffer mechanism with parts in horizontal section.

The machine may be equipped with a pair of buffers 107 and 108 as shown in Figs. 16 to 19 inclusive, which buffers are mounted on a shaft 109 journalled on a vertically oscillatory frame 110 pivoted on a shaft 111 and arranged along side the frame 86 and manually operable to bring the buffers into contact with the tread portion of the tire being worked; the frame 110 being normally disposed in an uppermost position by a spring 112 and being fitted with a hand-hold 113 by means of which the frame 110 may be depressed to lower the buffers into operative position. A beveled gear 114 on the shaft 109 meshes with a gear 115 on a stud shaft 116 connecting through a universal joint 117 with a shaft 118 which in turn connects through a universal joint 119 with a pulley 120 engaged by a belt 121 leading from a pulley 122 on the shaft carrying the pulley 103 whereby the buffers may be driven from the motor. As a means for enabling shifting the tire carrier transversely to bring the tire thereon in operative relation to the cutter and to the buffers, the shaft 21 is mounted to slide longitudinally in the sleeve 22 and as a means for fastening the shaft against movement when in its desired position, the sleeve 22 is fitted with a clamp screw 123 as shown in Fig. 9 and the jaw 24 is fitted with a clamp screw 124 as shown in Fig. 11.

In the operation of the invention the tire engaging extensions 36 are retracted by operation of the discs 39 and 40 so that a tire may be positioned over their outer ends, the sleeves 26 and 27 are disposed in their innermost position relatively to each other by operation of the threaded stem 33, the bar 50 is lowered by releasing the pawl 53 to bring the roller 51 thereon to a position that will permit the tire being placed thereover, and the shaft 21 is swung outwardly so that its outer end will be free whereupon the tire is passed over the outer end of the shaft and positioned astride the fingers 38 on the extensions 36 as shown in Fig. 13, which extensions are advanced to bring the fingers into engagement with the tire by operation of the discs 39 and 40. The sleeves 26 and 27 are then separated to spread the tire whereupon the bar 50 is elevated to bring the roller 51 against the inner periphery of the tire as shown in Fig. 14. The shaft is then restored to its innermost position and is shifted longitudinally if necessary to bring the tread of the tire in proper position opposite the cutter. The cutter is then adjusted to dispose it in position to engage the tire tread by means of the adjusting nut 90 and hand-wheel 93, and the hand-hold 94; the cutter being initially disposed in close proximity to the tire tread and after the tire has been set in motion and caused to revolve over the roller 51 by throwing the tire carrier driving mechanism into operation by depressing the foot lever 65 the cutter is advanced by operating the hand wheel 93 so as to effect a severing action on the tire tread. The cutter is ordinarily first positioned to effect severance of the tire tread along the center thereof and is then canted by means of the handle 94 after shifting the tire carrier sideways so as to effect severance of portions of the tire tread on either side of the center thereof. In this manner the tread may be removed along the portion thereof overlapping the side wall of the tire. It will be noted that the roller 51 will serve to oppose depression of the tire under the pressure of the cutter and will insure the uncut portion of the tire extending between the cutter and the roller being of substantially uniform wall thickness and that by reason of the roller being rounded transversely the tire will be held against shifting sidewise while being acted on by the cutter. After the tread has been removed by the cutter the trimmed surface of the carcass may be subjected to the action of the buffers 107 and 108 by shifting the shaft 21 longitudinally to bring the tire beneath the desired buffer and then depressing the buffer into operative contact with the surface of the carcass through the medium of the hand-hold 113.

To remove the detreaded tire the shaft 21 is swung outwardly, the roller 51 is lowered clear of the tire, and the tire engaging extensions 36 are retracted so as to free the tire and permit its being lifted from the carrier.

While I have shown and described a specific form of my invention I do not limit myself to the exact details of construction and arrangement shown, but may employ such changes and modifications as occasion may require coming within the spirit and scope of the appended claims.

I claim:

1. In a tire detreading machine, a revoluble circular cutting blade having a peripheral knife edge, means for driving same, a support for said cutting blade, means for carrying and rotating a tire carcass arranged to present the tread thereof to said cutter; said support and blade being arranged to present the blade tangentially to the tread of a tire carcass being worked, means whereby said blade may be tilted to vary the tangential relation of the blade to the tread of the tire carcass, and means whereby the blade may be presented to the tire carcass at various points transversely thereof.

2. In a tire detreading machine, a revoluble circular cutting blade having a peripheral knife edge, means for driving same, a support for said cutting blade, means for carrying and rotating a tire arranged to present the tread thereof to said cutter; said blade being arranged to be presented tangentially to the tread of a tire carcass being worked, and means whereby said support may be disposed in various positions to present the blade to the tire tread at various points transversely thereof.

3. In a tire detreading machine, a revoluble circular cutting blade having a peripheral knife edge, means for driving same, a support for said cutting blade operable to advance or retract the cutter on an arc; means for carrying and rotating a tire carcass arranged to present the tread thereof to said cutter; said blade being arranged to be presented tangentially to the tread of a tire carcass being worked, and means whereby said blade may be swung from side to side.

4. In a tire detreading machine, a revoluble circular cutting blade having a peripheral knife edge, means for driving same, a vertically movable support for said cutting blade, means for rotating a tire carcass arranged to present the tread thereof to said cutter; said blade being arranged to be presented tangentially to the tread of a tire carcass being worked, means whereby said blade may be swung forward and back, and means whereby said blade may be swung from side to side.

5. In a tire detreading machine, a revoluble circular cutting blade having a peripheral knife edge, means for driving same, a rotary tire carrier having a substantially circular peripheral portion adapted to adjustably engage the inner surface of a tire arranged to present the tread of a tire thereon to said cutting blade, and a roller arranged to bear against the inner periphery of a tire on said carrier opposite said cutter and over which the tire is passed on rotation of the carrier; said blade being presented tangentially towards the periphery of said roller.

6. In a tire detreading machine, a revoluble cutter, means for driving same, a rotary tire carrier arranged to present the tread of a tire thereon to said cutter, a roller arranged to bear against the inner periphery of a tire on said carrier opposite said cutter and over which the tire passes on rotation of the carrier, and means whereby said roller may be disposed in various projected or retracted positions.

7. In a tire detreading machine, a rotary tire carrier adapted to support a tire, while maintaining its circular contour, a roller arranged to bear against the inner periphery of a tire on said carrier and over which the tire passes on rotation of said carrier, said roller being rounded transversely, and a rotary cutter operable to effect severance of the tread of a tire carcass on said carrier.

8. In a tire detreading machine, a revoluble tire carrier adapted to support a tire, while maintaining its circular contour, means embodied in said carrier operable to effect spreading of a tire thereon, a roller arranged to bear against the inner periphery of a tire on said carrier over which the tire passes on rotation of the carrier, and power operated means for effecting severance of the tire tread as the carrier revolves.

9. In a tire detreading machine, a revoluble tire carrier embodying two groups of members engageable with the inner periphery of a tire, means whereby said groups of members may be advanced or retracted relatively to each other and operable to effect spreading of a tire thereon, a roller arranged to bear against the inner periphery of a tire on said carrier over which the tire passes on rotation of the carrier, and means for effecting severance of the tire tread on rotation of said carrier.

10. In a tire detreading machine, a tire carrier, means for rotating same, means embodied in said carrier for effecting spreading of a tire thereon, means for severing the tread portion of a tire on said carrier as the latter revolves, an oscillatory support for said carrier, and means whereby said carrier may be shifted from side to side on said support.

KARL W. LIEBAU.